Jan. 3, 1950        J. DE MONTREMY        2,493,392

PHOTOGRAPHIC CAMERA PROVIDED WITH RANGE FINDER

Filed July 25, 1945        3 Sheets-Sheet 1

INVENTOR
JEAN DE MONTREMY
BY Mock & Blum
ATTORNEYS

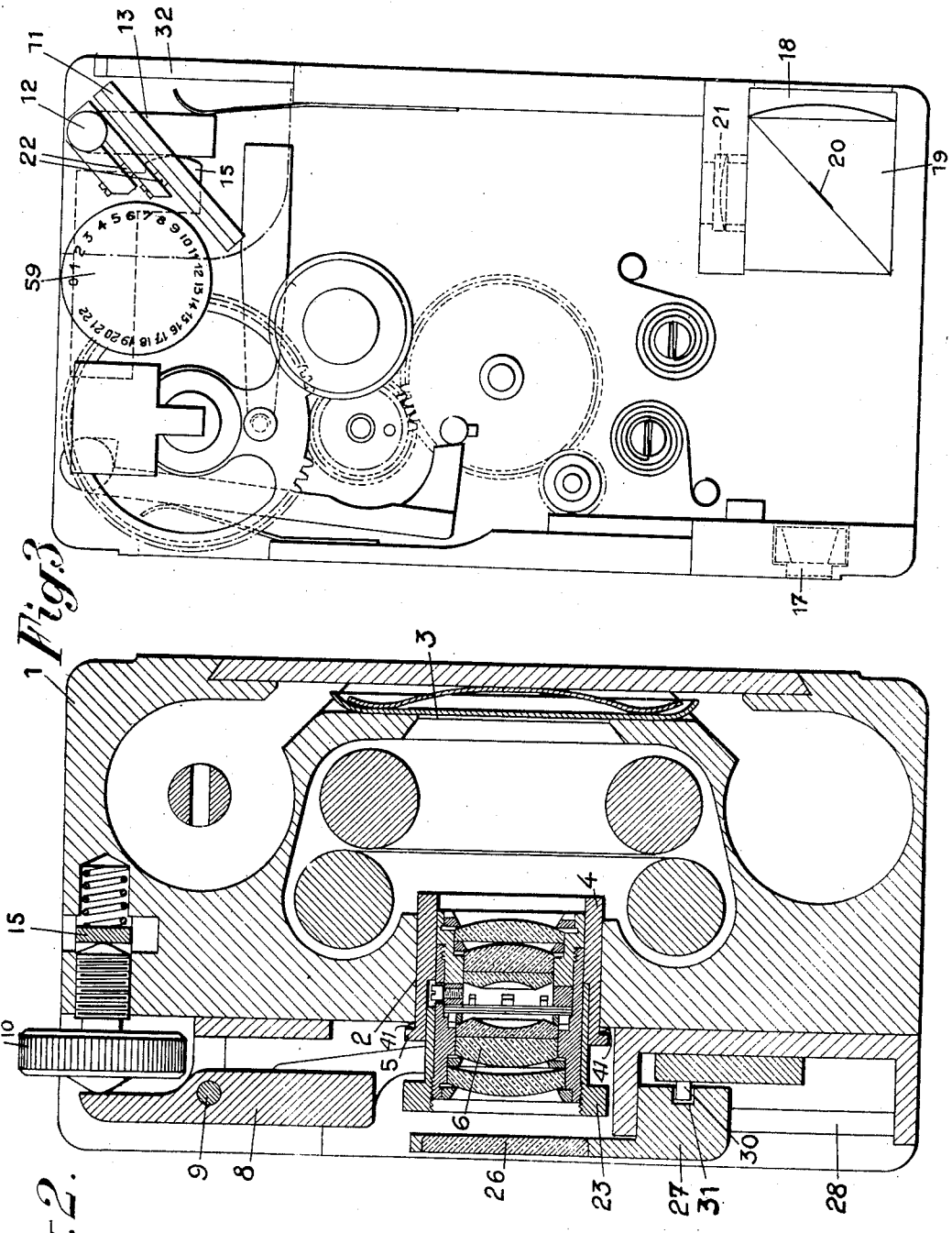

Jan. 3, 1950     J. DE MONTREMY     2,493,392
PHOTOGRAPHIC CAMERA PROVIDED WITH RANGE FINDER
Filed July 25, 1945     3 Sheets-Sheet 3

INVENTOR
JEAN DE MONTREMY
BY Mock & Blum
ATTORNEYS

Patented Jan. 3, 1950

2,493,392

UNITED STATES PATENT OFFICE 2,493,392

PHOTOGRAPHIC CAMERA PROVIDED WITH RANGE FINDER

Jean de Montremy, Pau, France

Application July 25, 1945, Serial No. 606,959
In France January 29, 1945

2 Claims. (Cl. 95—44)

The present invention relates to photographic cameras, more particularly of small size, of the type including a range finder with the adjustable element of which the camera focussing device is coupled so that focussing is automatically ensured when the two images given by the range finder are made to coincide.

An object of my present invention is to produce a camera of this kind which is more reliable in operation, simpler and cheaper to manufacture, and less liable to deterioration than those hitherto made.

Thus the invention comprises a photographic camera including a range finder coupled with the camera focussing device, and in which the objective lens is mounted in a support freely slidable axially with respect to the camera frame against the action of opposing spring means and the range finder includes a mirror carried by a support pivoted to said frame at a point thereof spaced from the range finder objective, said support being urged by spring means to pivot in one direction, characterized in that means operable from the outside of the camera are provided directly to rotate said screw, one end of which is in contact with a lever pivoted to said frame and adapted to transmit the longitudinal movements of said screw to said lens support against the action of its opposing spring means, and push-piece means are interposed between said screw and said mirror support to pivot said support against its spring means in response to longitudinal displacements of said screw.

The invention will best be understood by means of the following description and the accompanying drawings which are, of course, given only by way of example.

In these drawings, Fig. 1 is a perspective view of a camera made in accordance with the invention;

Fig. 2 is a sectional view of this camera on the line II—II of Fig. 4;

Fig. 3 is a sectional view on the line III—III of Fig. 4;

Figure 1:
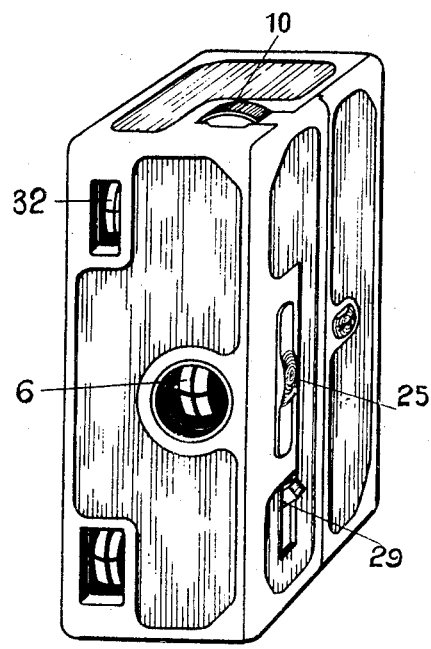

In the drawings, there is shown a camera in the form of a parallelepiped which may be of small size, i. e. may have dimensions of the order of 8 x 5 x 4 centimetres (these dimensions are given by way of indication only), owing to the simplicity of the various parts which it embodies.

The camera comprises a rigid box frame 1 (see Fig. 2), in which is provided a cylindrical opening 2 having its axis perpendicular to the plane of a window 3 past which the film is adapted to move. In this opening 2 slides a sleeve 4 terminating in a square flange 5. This sleeve 4 is intended to receive a photographic lens 6.

Figure 4:
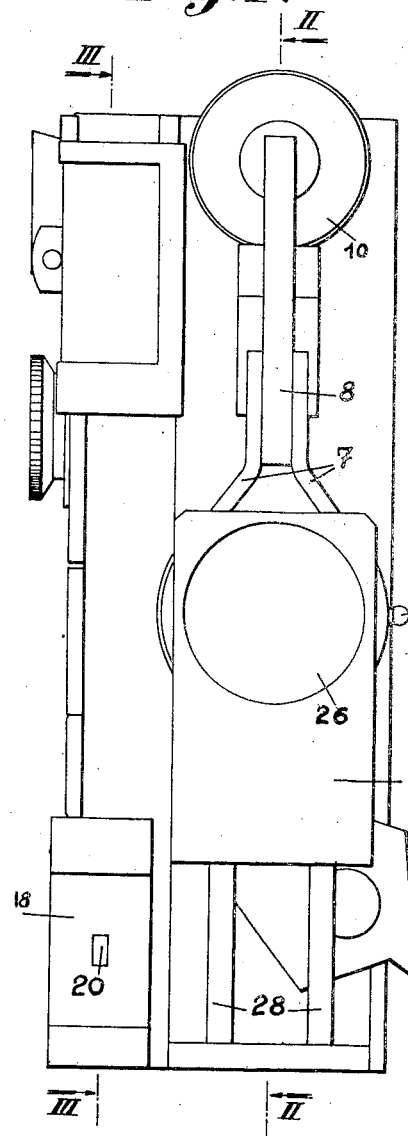
Fig. 4 is a front view, the casing being removed.
Figure 5:
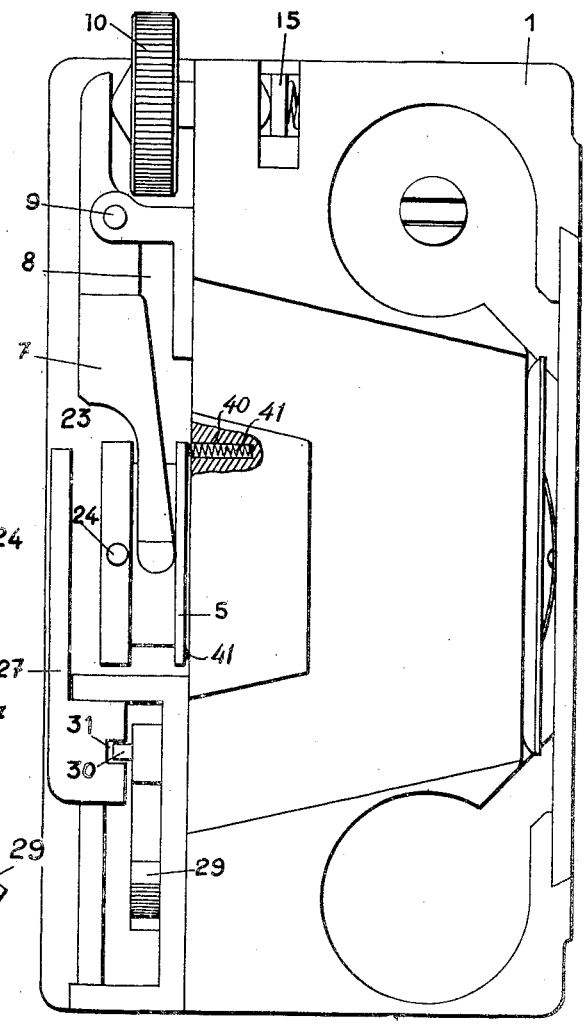
Fig. 5 is a side view, the casing being removed.

In the box 1 and opposite the four corners of the flange 5 are provided four holes 40 for accommodating four coil springs 41. These springs 41, being imprisoned between the box frame 1 of the camera and the four corners of the flange 5, urge the sleeve 4, and therefore the lens 6 which it carries, away from the film applied against the window 3. The lens is, however, maintained in its focussing position by a fork 7 (Figs. 2, 4 and 5), rigid with a lever 8 which is pivoted at 9 to the camera frame 1 and has its other end bearing against a screw 10 threaded in the camera body and rotatable by means of a knurled protruding knob 10'.

The photographic lens and its mounting are disposed well within the outer contour of the camera casing.

The screw 10 is connected, not only to the photographic lens, but also to a telemetric view-finder, so that it enables range-finding to be effected at the same time as it focusses the camera, in accordance with a known arrangement.

The telemetric view-finder structure is preferably constituted as hereinafter described, the preferred optical arrangement of the combined view-finder and range finder being illustrated in Fig. 3.

The view-finder comprises an inverted Galilean telescope of the conventional type, constituted by a positive eye lens 17 the focus of which coincides with the focus of a negative lens 18. The dimensions of the square negative lens 18 are such that the field of this telescope is the same as that of the image protected by the lens 6 on the portion of the film present in the window 3.

Between the two lenses 17 and 18 is interposed a cube 19 constituted by two total reflecting prisms having their hypotenuse faces, which are inclined at 45° to the axis of the telescope, applied flat against one another.

In one of these faces there is provided a shallow flat bottomed recess 20, for example square in shape. Due to total internal reflection, this surface 20 reflects towards the eye-piece 17 light rays from the object to be photographed which have entered the camera through a window 32 and have been reflected by a movable mirror 11 through a lens 21. The negative lens 21 has exactly the same optical characteristics, and is placed at the same distance from the centre of the cube 19, as the negative lens 18. In this manner, a person looking through the eye-piece 17 uses the telescope 17—18 as an ordinary view-finder, but sees in the central portion of the field a square image element reflected from mirror 11.

This mirror 11 is rigid with an element 13 which is pivoted at 12 to the camera frame 1 and is urged by a spring 14 against a further element 15, a portion of which (Fig. 2) is trapped between a spring 16 and the end of the screw 10 opposite to that bearing against the lever 8.

Thus the position of mirror 11 about pivot 12 is constantly interrelated with the axial position of the lens mounting sleeve 4 in the camera frame. Lost motion is practically eliminated by the provision of the springs 14, 16, and those urging the lens away from the film.

The parts are adjusted in such manner that the camera is correctly focussed when the image reflected from the square central portion 20 of the prisms fits the remainder of the image seen through the view-finder 17—18.

Screws 22 serve to enable mirror adjustments of the mirror 11 to be made.

With the camera lens is associated a filter for yellow or red light mounted in a frame 27 slidable along two small pillars 28. By rocking a lever 29, and through the medium of a pin 30 integral with this lever 29 and of a groove 31 provided in the member 27, the filter can be slidden in front of the lens and is withdrawn therefrom.

I claim:

1. In a photographic camera, the combination of a frame, a photographic lens support freely slidable axially with a translatory motion in said frame for focussing, elastic means for urging said lens to slide in one direction axially with respect to said frame, a range finder including an eye-piece and an objective fixed to said frame, a mirror and a support for said mirror pivoted to said frame at a point thereof distant from said objective, elastic means for urging said support to pivot in one direction, said frame being provided with a screw-threaded portion, a screw in mesh with said screw-threaded portion, means for directly rotating said screw operable from the outside of the camera, lever means bearing on the one hand against said screw and on the other hand against said lens support for transmitting longitudinal movements of said screw to said lens support against the action of said first mentioned spring means, and push-piece means interposed between said screw and said mirror support for transmitting longitudinal displacements of said screw to a point of said mirror support against the action of the second mentioned spring means.

2. In a photographic camera, the combination of a frame, a photographic lens support freely slidable axially with a translatory motion in said frame for focussing, elastic means for urging said lens to slide in one direction axially with respect to said frame, a range finder including an eye-piece and an objective fixed to said frame, a mirror and a support for said mirror pivoted to said frame at a point thereof distant from said objective, elastic means for urging said support to pivot in one direction, said frame being provided with a screw-threaded portion, a screw in mesh with said screw-threaded portion including an operating disc rigid therewith projecting to the outside of the camera, lever means bearing on the one hand against said screw and on the other hand against said lens support for transmitting longitudinal movements of said screw to said lens support against the action of said first mentioned spring means, and push-piece means interposed between said screw and said mirror support for transmitting longitudinal displacements of said screw to a point of said mirror support against the action of the second mentioned spring means.

JEAN DE MONTREMY.

REFERENCES CITED

The following references are of record in the file of this patent:

UNITED STATES PATENTS

| Number | Name | Date |
| --- | --- | --- |
| 645,477 | Lee et al. | Mar. 13, 1900 |
| 1,613,363 | Tessier | Jan. 4, 1927 |
| 2,007,016 | Kubica | July 2, 1935 |
| 2,127,925 | Leitz | Aug. 23, 1938 |
| 2,134,766 | Schieber et al. | Nov. 1, 1938 |
| 2,151,124 | Leitz | Mar. 31, 1939 |
| 2,206,144 | Wittel | July 2, 1940 |
| 2,273,430 | Bing | Feb. 17, 1942 |
| 2,313,567 | Mihalyi | Mar. 9, 1943 |
| 2,353,227 | Drotning | July 11, 1944 |
| 2,358,092 | Luboshez | Sept. 12, 1944 |
| 2,367,195 | Bolsey | Jan. 16, 1945 |
| 2,379,698 | Fischer | July 3, 1945 |
| 2,380,453 | Lateiner | July 31, 1945 |

FOREIGN PATENTS

| Number | Country | Date |
| --- | --- | --- |
| 156,472 | Switzerland | Oct. 17, 1932 |
| 792,160 | France | Oct. 14, 1935 |